United States Patent [19]
Hatano et al.

[11] Patent Number: 5,654,770
[45] Date of Patent: Aug. 5, 1997

[54] LUMINANCE AND CHROMINANCE SIGNAL SEPARATOR USING CORRELATION DETECTION

[75] Inventors: Takahisa Hatano, Sapporo; Yoshihisa Nishigori, Itami, both of Japan

[73] Assignee: Matsushita Electric Industrial Co. Ltd., Osaka, Japan

[21] Appl. No.: 326,694

[22] Filed: Oct. 20, 1994

[30] Foreign Application Priority Data

Oct. 21, 1993 [JP] Japan .................................. 5-263399

[51] Int. Cl.[6] ........................................... H04N 9/78
[52] U.S. Cl. ................................. 348/668; 348/667
[58] Field of Search ............................ 348/663–668; H04N 9/78

[56] References Cited

U.S. PATENT DOCUMENTS

| | | | |
|---|---|---|---|
| 4,855,815 | 8/1989 | Yasuki et al. | 558/31 |
| 4,907,073 | 3/1990 | Sugiyama | 358/31 |
| 4,982,271 | 1/1991 | Sugiyama et al. | 358/31 |
| 4,994,906 | 2/1991 | Moriwake | 348/664 |
| 5,194,942 | 3/1993 | Sim et al. | 345/663 X |

FOREIGN PATENT DOCUMENTS

| | | | |
|---|---|---|---|
| 358453 | 3/1990 | European Pat. Off. | H04N 9/78 |
| 4-81191 | 3/1992 | Japan | H04N 9/78 |
| 4-81192 | 3/1992 | Japan | H04N 9/78 |
| 2244885 | 12/1991 | United Kingdom | H04N 9/78 |

*Primary Examiner*—Victor R. Kostak
*Assistant Examiner*—John W. Miller
*Attorney, Agent, or Firm*—Ratner & Prestia

[57] ABSTRACT

A device that separates a luminance signal and a chrominance signal from an input composite color television signal, suppressing cross color interference and keeping a good color transient characteristic, by selecting characteristics of the color bandpass filters according to a vertical correlation value after obtaining a chrominance signal at an adaptive type comb filters. The apparatus includes a cascade connection of a plurality of delay devices each one of which delays one horizontal period; a correlation detecting circuit for outputting correlation values between the reference signal and a signal at the vertical vicinity of the point of the reference signal on the screen, where an output signal of the central delay device is regarded as a reference signal; comb filters for separating a chrominance signal from the composite color television signal; a plurality of bandpass filters for limiting the bandwidth of the chrominance signal obtained at the comb filters; and a mixing circuit for mixing the outputs of the bandpass filters according to the correlation values between the reference signal and the signal at the vertical vicinity of the point of the reference signal.

1 Claim, 3 Drawing Sheets

LUMINANCE AND CHROMINANCE SIGNAL SEPARATOR USING CORRELATION DETECTION

BACKGROUND OF THE INVENTION (1) Field of the Invention

The present invention relates to luminance and chrominance signal separating apparatus for separating a luminance signal and a chrominance signal from an NTSC composite color television signal.

(2) Description of the Prior Art

Recently, progress of digital signal processing technique accompanies that an adaptive type luminance and chrominance signal separating apparatus which selects a plurality of filters according to exsistence of correlation between an arbitrary reference signal and the signals at the vicinity of the position of the reference signal in a horizontal or vertical direction on the screen, as a luminance and chrominance signal separating apparatus which separates a luminance signal and a chrominance signal from a composite color television signal.

FIG. 1 is a block diagram of a luminance and chrominance signal separating apparatus in accordance with the prior art.

A bandpass filter 501 extracts a chrominance signal component from a composite color television signal (hereafter, called VBS signal, which means video burst signal). Each one of 1H delay devices 502, 503 and 504 delays a signal by 1H period, where 1H means one horizontal period. In digital circuits, memory devices are usually used as delay devices. A comb filter 505 is supplied with the output signal of the bandpass filter 501 and the output signal of the delay device 502 which is delayed from the output signal of the bandpass filter 501 by 1H period and outputs a chrominance signal. A comb filter 506 is supplied with the output signal of the delay device 502 which is delayed from the output of the bandpass filter 501 by 1H period and the output signal of the delay device 503 which is delayed from the output of the bandpass filter 501 by 2H periods and outputs a chrominance signal.

An adder 507 adds the output signal of the bandpass filter 501 and the output signal of the delay device 502 which is delayed from the output signal of the bandpass filter 501 by 1H period. An adder 508 adds the output signal of the delay device 502 which is delayed from the output signal of the bandpass filter 501 by 1H period and the output signal of the delay device 503 which is delayed from the output signal of the bandpass filter 501 by 2H periods.

Absolute value circuits 509 and 510 calculate absolute values of the output signals of the adders 508 and 507, respectively. Low pass filters 511 and 512 filter the output signals of the absolute value circuits 509 and 510, respectively and output their average values. A comparator 513 compares the output signals of the low pass filters 511 and 512 and judges which correlation is stronger. A smaller average value means stronger correlation. A converting circuit 514 converts the output signal of the comparator 513 into a mixing coefficient of the comb filters 505 and 506. A band pass filter 516 limits the bandwidth of the chrominance signal which is an output of the mixing circuit 515. A subtracter 517 subtracts the output of the bandpass filter 516 which is a final chrominance signal from a signal which is delayed from the input VBS signal by 1H period.

A chrominance signal is extracted from the input VBS signal at the bandpass filter 501. The extacted chrominance signal component is applied to the delay devices 502 and 503 in order and one input signal to the delay device 502 and the two output signals from the deley devices 502 and 503 are applied to the two comb filters 505 and 506. Because each comb filter 505 and 506 is supplied with two signals which have an 1H period time difference, the output of each comb filter becomes a chrominance signal.

While, two pairs of signals, each pair of which has an 1H period time difference, are added at the adders 508 and 507, the sums are outputted to the following absolute value circuits 509 and 510, absolute value signals are filtered at the low pass filters 511 and 512 and average values of the absolute values are outputted from the low pass filters 511 and 512. These values are vertical correlation values. The correlation values are compared at the comparator 513. The smaller the value is, the stronger the vertical correlation is. The comparison result is converted to mixing coefficients for the comb filters 505 and 506. The mixing circuit 515 outputs an optimum chrominance signal by weighting the output of the comb filters 505 and 506 according to the mixing coefficients and mixing the two weighted signals. The output chrominance signal from the mixing circuit 515 is limited with its frequency band at the bandpass filter 516. A perfect chrominance signal is outputted from the bandpass filter 516 by limiting the frequency band of the output signal of the mixing circuit 515. While, a perfect luminance signal is obtained by subtracting the perfect chrominance signal from the bandpass filter 516 from a signal delayed by 1H period from the input VBS signal at the subtracter 517.

However, in the above configuration, because the bandpass filter 516 which limits the bandwidth of the chrominance signal has a fixed frequency characteristic, if the bandwidth is wide, the color transient characteristic is good but cross color interference is remarkable when there is no vertical correlation and if the bandwidth is narrow, the color transient characteristic is bad. This is a problem.

SUMMARY OF THE INVENTION

To solve the above problem, a luminance and chrominance signal separating apparatus of the present invention include a cascade connection of delay devices, where each delay device delays a composite color television signal by a horizontal period and a signal at the central junction point of the cascade connected delay devices is regarded as a reference signal;

correlation detecting circuits for calculating correlation values between the reference signal and a signal at the vertical vicinity of the point for the reference signal on the screen;

comb filters for separating a chrominance signal from the composite color television signal;

a first mixing circuit for mixing the outputs of the comb filters which are weighted according to the correlation values before mixing;

bandpass filters for limiting the bandwidth of the chrominance signal outputted from the first mixing circuit; and a second mixing circuit for mixing the outputs of the bandpass filters which are weighted according to the correlation values before mixing.

The present invention offers a luminance and chrominance signal separating apparatus which can prevent cross color interference, keeping a good color transient characteristic.

DETAILED DESCRIPTION OF THE INVENTION

Figure 1:
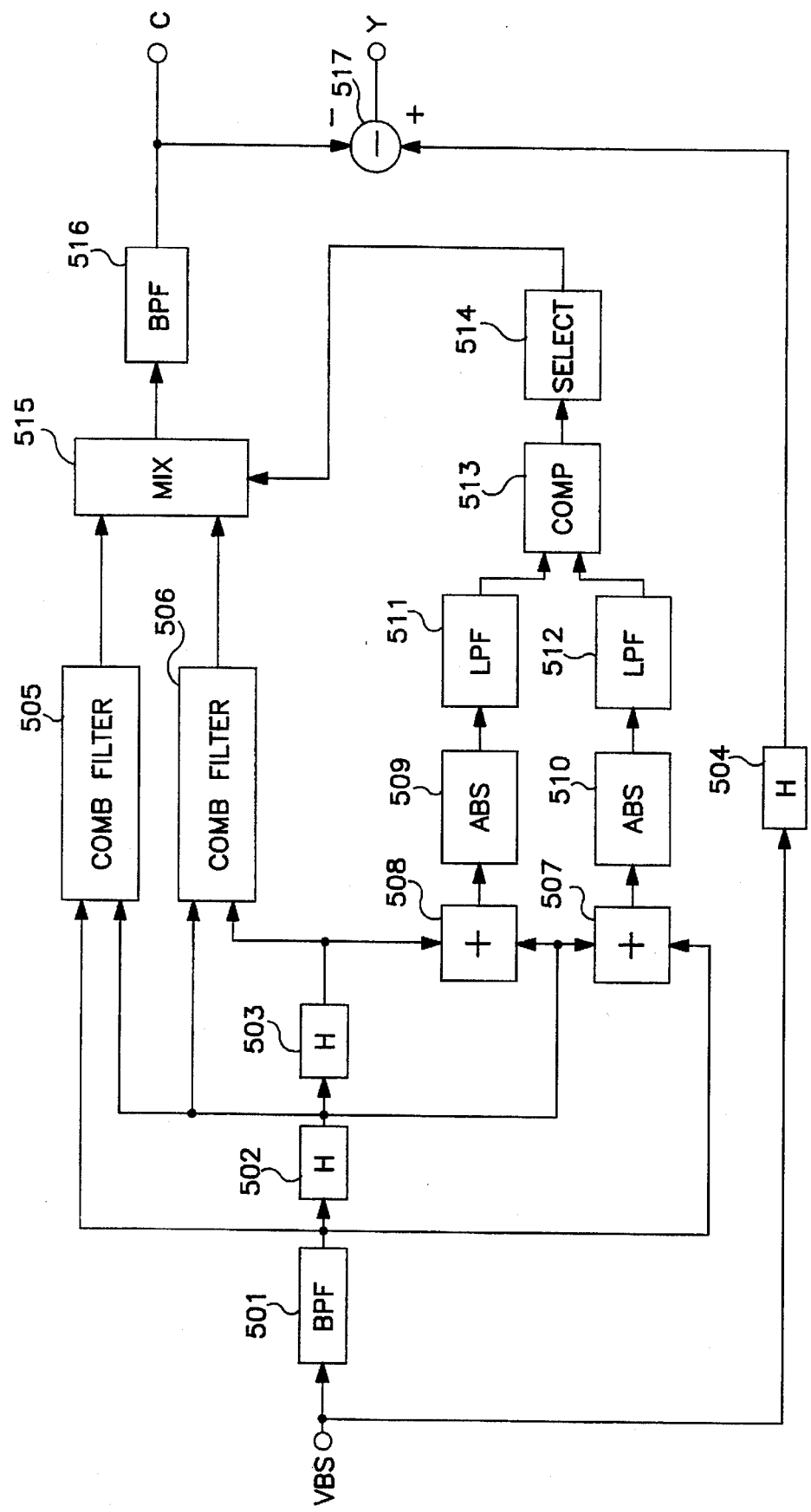
FIG. 1 is a block diagram of a luminance and chrominance signal separating apparatus in accordance with the prior art.
Figure 2:
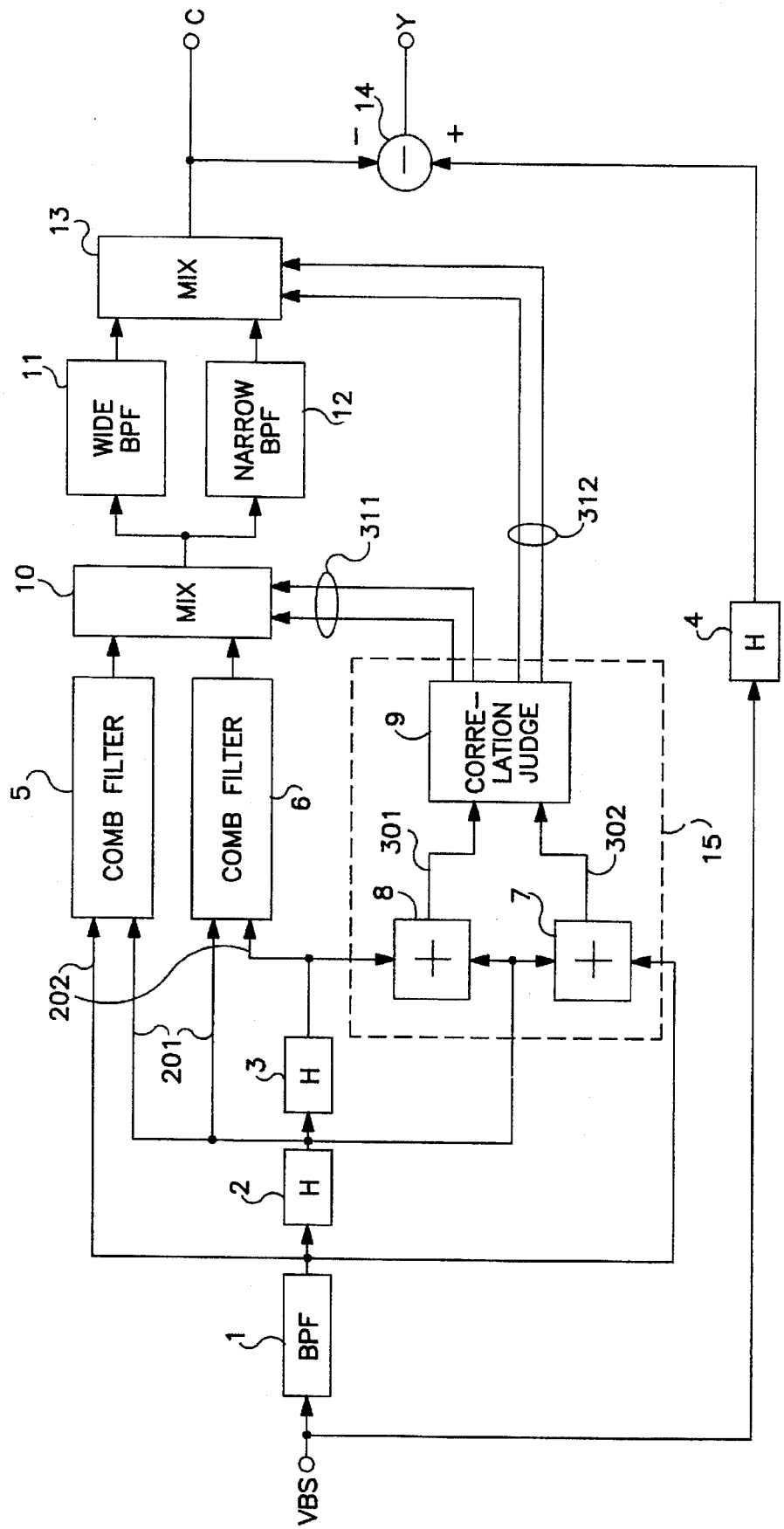
FIG. 2 is a block diagram of a luminance and chrominance signal separating apparatus in accordance with an exemplary embodiment of the present invention.

FIG. 2 is a block diagram of a luminance and chrominance signal separating apparatus in accordance with an exemplary embodiment of the present invention.

A bandpass filter 1 extracts a chrominance signal from an input VBS signal. Each one of delay devices 2, 3 and 4 delays a signal by 1H period. A comb filter 5 separates a chrominance signal from an output signal of the bandpass filter 1 and a signal delayed by 1H period from the output signal of the delay device 2

A comb filter 6 separates a chrominance signal from the signal delayed by 1H period from the output signal of the delay device 2 filter 1 and a signal delayed by 2H periods from the output signal of the delay device 3.

An adder 7 adds the output signal of the bandpass filter 1 and the signal delayed by 1H period from the output signal of the delay device 2. An adder 8 adds the signal delay by 1H period from the output signal of the delayed device 3 and a signal delay by 2H periods from the output signal of the delayed device 3.

A correlation judging circuit 9 calculates a correlation value from the output signals of the adders 7 and 8 and outputs mixing coefficients. The adders 7 and 8 and the correlation judging circuit 9 form a correlation detecting circuit 15. A first mixing circuit 10 weighs the output signals of the comb filters 5 and 6 according to the correlation value and mixes the weighted signals. A wide bandpass filter 11 limits the bandwidth of the chrominance signal which is an output of the mixing circuit 10 to a wider bandwidth. A narrow bandpass filter 12 limits the bandwidth of the chrominance signal which is an output of the mixing circuit 10 to a narrower bandwidth. A second mixing circuit 13 weighs the output signals of the wide bandpass filter 11 and the narrow bandpass filter 12 according to the correlation value, mixes the weighted signals and outputs a perfectly separated chrominance signal. A subtracter 14 subtracts the output of the mixing circuit 13 which is a final chrominance signal from the signal delayed by 1H period from the input VBS signal and outputs a perfectly separated luminance signal.

Figure 3:
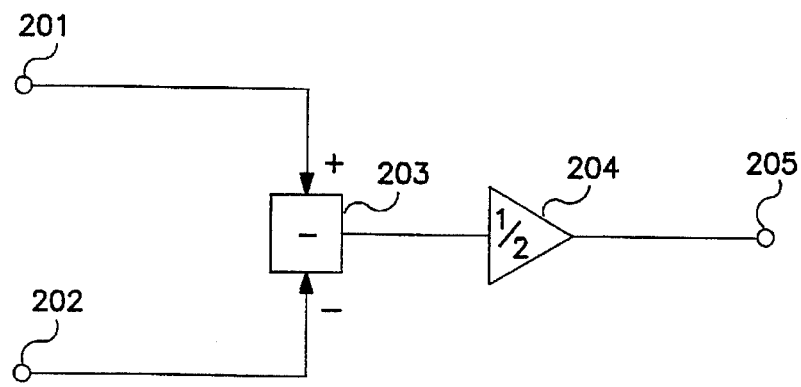
FIG. 3 is a block diagram of a comb filter used in a luminance and chrominance signal separating apparatus in accordance with the exemplary embodiment of the present invention.

A block diagram of a comb filter used in a luminance and chrominance signal separating apparatus in accordance with the exemplary embodiment of the present invention is, shown in FIG. 3.

A signal 201 is delayed by 1H period from the output of the delay device 2. A signal 202 is apart from (ahead of or behind) the signal 201 by 1H period. A subtracter 203 subtracts the signal 202 from the signal 201. A divider 204 divides the output of the subtracter 203 by 2. A luminance signal 205 is obtained at the output of the divider 204.

Figure 4:
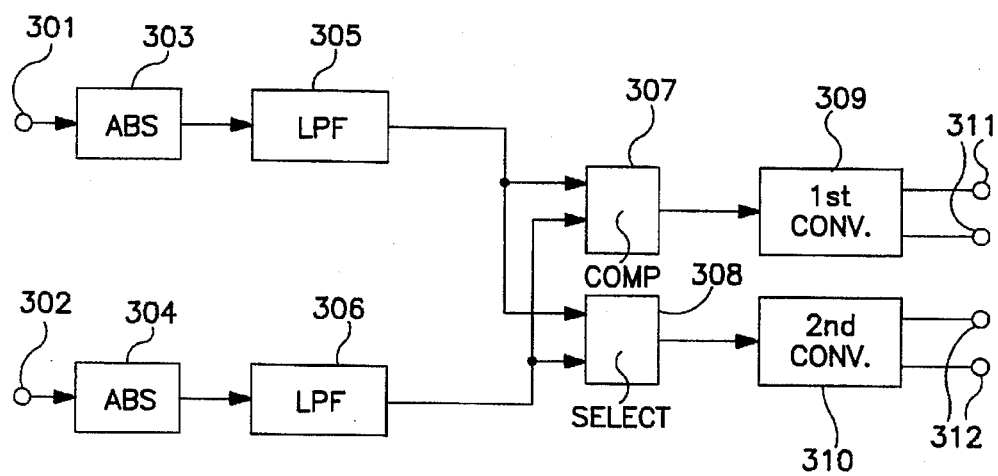
FIG. 4 is a block diagram of a correlation detecting circuit used in a luminance and chrominance signal separating apparatus in accordance with the exemplary embodiment of the present invention.

A block diagram of a correlation detecting circuit used in a luminance and chrominance signal separating apparatus in accordance with the exemplary embodiment of the present invention is shown in FIG. 4.

Absolute value circuits 303 and 304 output the absolute values of the output signals 301 and 302 of the adders 8 and 7, respectively. Low pass filters 305 and 306 filter the output signals of the absolute value circuits 303 and 304 and outputs average values of the absolute values. A comparator 307 compares which output of the low pass filters 305 or 306 is smaller. A selector 308 selects a smaller value of the outputs of the low pass filters 305 and 306. A first converting circuit 309 converts the output signal of the comparator 307 into a mixing coefficient 311 of the comb filters 5 and 6. A second converting circuit 310 converts the output of the comparator 308 into a mixing coefficient 312 of the bandpass filters 11 and 12. The output signal 311 of the first converting circuits 309 is a mixing coefficient determining a mixing ratio of the outputs of the comb filters 5 and 6. The output signal 312 of the converting circuits 310 is a mixing coefficient determining a mixing ratio of the outputs of the bandpass filters 11 and 12.

A chrominance signal is extracted from the input VBS signal at the bandpass filter 1. The extracted chrominance signal component is delayed each 1H period at the 1H delay devices 2 and 3. A signal delayed by 1H period from the input VBS signal is obtained at the output of the delay device 2 and a signal delayed by 2H periods from the input VBS signal is obtained at the output of the delay device 3. One input signal to the delay device 2 and the two output signals from the delay devices 2 and 3 are applied to the two comb filters 5 and 6. Because each comb filter 5 and 6 is supplied with two signals which have an 1H period time difference, the output of each comb filter becomes a chrominance signal.

While, two pairs of signals, each pair of which has an 1H period time difference, are added at the adders 8 and 7, the sums are outputted to the following correlation judging circuit 9. In the correlation judging circuit 9, absolute values of the output signals 301 and 302 of the adders 7 and 8 are outputted from the absolute value circuits 303 and 304 and then, average values of the absolute values are outputted from the low pass filters 305 and 306, respectively. Which average value is smaller is compared at the comparator 307. The compared result is converted into a mixing coefficient 311 for the comb filters 5 and 6 at the first converting circuit 309. The smaller output of the low pass filter 305 or 306 is selected at the selecting circuit 308 and is converted into a mixing coefficient 312 for the bandpass filters 11 and 12 at the second converting circuit 310. An optimum chrominance signal is obtained at the first mixing circuit 10 by weighting and mixing the output of the comb filter 5 or 6 according to the mixing coefficient 311 from the correlation judging circuit 9. The mixed chrominance signal is applied to the wide bandpass filter 11 and the narrow bandpass filter 12.

Figure 5:
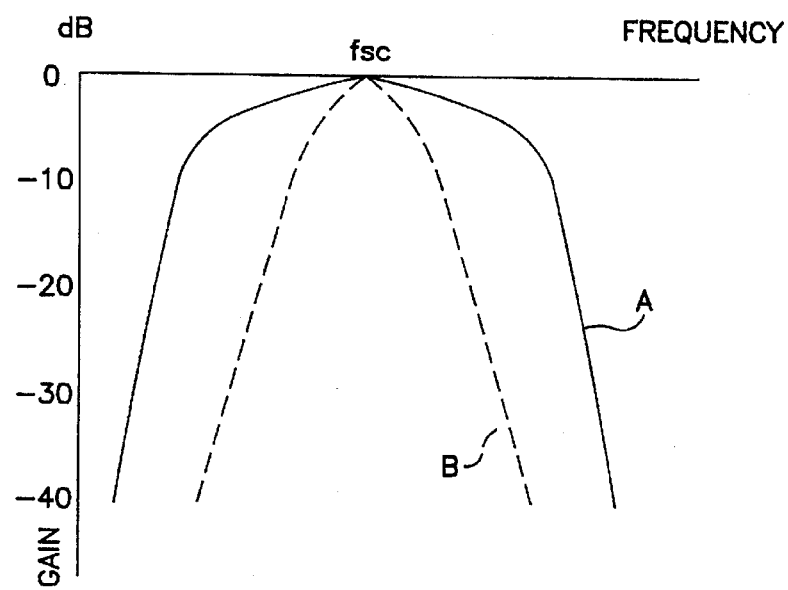
FIG. 5 is frequency characteristics of a wide bandpass filter and a narrow bandpass filter used in a luminance and chrominance signal separating apparatus in accordance with the exemplary embodiment of the present invention.

The wide bandpass filter 11 and the narrow bandpass filter 12 have frequency characteristics shown as A and B in FIG. 5, respectively. The output signals of the wide bandpass filter 11 and the narrow bandpass filter 12 are weighed and mixed at-the second mixing circuit 13 according to the mixing coefficient 312 outputted from the correlation judging circuit 9. Here, if there is some correlation, the output of the wide bandpass filter 11 is weighed and if there is no correlation, the output of the narrow bandpass filter 12 is weighed.

The output of the second mixing circuit 13 is a perfectly separated chrominance signal. A perfectly separated luminance signal is obtained by subtracting the final chrominance signal from the second mixing circuit 14 from a signal delayed by 1H period at the delay device 4 from the input VBS signal at the subtracter 14.

It is very difficult to discriminate a chrominance signal and a high frequency component of a luminance signal near a color burst frequency. Generally, decreasing cross color interference causes bad color transient characteristic and improving color transient characteristic causes cross color interference. When the vertical correlation is strong, like a color bar signal, bad color transient phenomenon is conspicious.

According to the present invention, a luminance signal and a chrominance signal can be separated keeping a good color transient characteristic and suppressing cross color interference by varying the bandwidth of the bandpass filters according to the vertical correlation value.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A luminance and chrominance signal separating apparatus comprising:

a cascade connection of a plurality of delay means, where each delay means delays a composite color television signal by one horizontal period and a signal at the central junction point of said cascade connected delay means is regarded as a reference signal, if the number of said delay means is even, and a signal at the junction point just ahead of or just behind the central delay means of said cascade connected delay means is regarded as a reference signal, if the number of said delay means is odd;

correlation detecting means for calculating correlation values between said reference signal and a signal at the vertical vicinity of the point for said reference signal on the screen;

a plurality of comb filters for separating a chrominance signal from said composite color television signal;

first mixing means for mixing the outputs of said comb filters which are weighed according to said correlation values before mixing;

a plurality of bandpass filter means for limiting the bandwidth of the chrominance signal outputted from said first mixing means;

second mixing means for mixing the outputs of said bandpass filter means which are weighed according to said correlation values before mixing and outputting a perfectly separated chrominance signal, and subtracting means for subtracting the output signal of said second mixing means from an output signal delayed by one horizontal period from the input composite color television signal and outputting a perfectly separated luminance signal.

* * * * *